US009179161B2

United States Patent
Blum

(10) Patent No.: US 9,179,161 B2
(45) Date of Patent: Nov. 3, 2015

(54) VIDEO ENCODING

(75) Inventor: David Blum, Nes Ziona (IL)

(73) Assignees: Nissim Nissimyan, Kiryat-Shmona (IL); Fima Feinblum, Beer-Sheva (IL)

( * ) Notice: Subject to any disclaimer, the term of this patent is extended or adjusted under 35 U.S.C. 154(b) by 51 days.

(21) Appl. No.: 13/319,091

(22) PCT Filed: May 20, 2010

(86) PCT No.: PCT/IL2010/000405
§ 371 (c)(1),
(2), (4) Date: Nov. 7, 2011

(87) PCT Pub. No.: WO2010/134079
PCT Pub. Date: Nov. 25, 2010

(65) Prior Publication Data
US 2012/0051434 A1     Mar. 1, 2012

Related U.S. Application Data

(60) Provisional application No. 61/179,731, filed on May 20, 2009.

(51) Int. Cl.
| | | |
|---|---|---|
| H04N 11/02 | (2006.01) |
| H04N 19/523 | (2014.01) |
| H04N 19/105 | (2014.01) |
| H04N 19/176 | (2014.01) |
| H04N 19/172 | (2014.01) |
| H04N 19/51 | (2014.01) |
| H04N 19/61 | (2014.01) |
| H04N 19/137 | (2014.01) |
| H04N 19/537 | (2014.01) |

(52) U.S. Cl.
CPC ........... *H04N 19/523* (2014.11); *H04N 19/105* (2014.11); *H04N 19/137* (2014.11); *H04N 19/172* (2014.11); *H04N 19/176* (2014.11); *H04N 19/51* (2014.11); *H04N 19/537* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 6,526,099 B1 * | 2/2003 | Christopoulos et al. . | 375/240.26 |
| 6,963,608 B1 * | 11/2005 | Wu .......................... | 375/240.03 |

(Continued)

FOREIGN PATENT DOCUMENTS

| | | |
|---|---|---|
| EP | 0797357 | 9/1997 |
| WO | WO 02/37859 | 5/2002 |
| WO | WO 2009/066284 | 5/2009 |

OTHER PUBLICATIONS

International Preliminary Report on Patentability Dated Dec. 1, 2011 From the International Bureau of WIPO Re. Application No. PCT/IL2010/000405.

(Continued)

*Primary Examiner* — Sath V Perungavoor
*Assistant Examiner* — Dakshesh Parikh

(57) ABSTRACT

A computerized method for encoding video comprising: dividing a video frame into macroblocks; for each macroblock finding a minimal movement or minimal error motion estimation compensation algorithm pair that encodes and decodes said macroblock with a smallest amount of motion or error; and encoding said frame by encoding each macroblock with a motion estimation algorithm of said respective minimal error motion estimation compensation pair.

12 Claims, 12 Drawing Sheets

(56) References Cited

U.S. PATENT DOCUMENTS

| | | | |
|---|---|---|---|
| 7,233,623 B1* | 6/2007 | Pau et al. | 375/240.2 |
| 2003/0053545 A1* | 3/2003 | Lainema et al. | 375/240.16 |
| 2003/0152151 A1* | 8/2003 | Hsieh et al. | 375/240.26 |
| 2003/0202596 A1* | 10/2003 | Lainema et al. | 375/240.16 |
| 2004/0184775 A1* | 9/2004 | Nakamura et al. | 386/69 |
| 2005/0018768 A1* | 1/2005 | Mabey et al. | 375/240.2 |
| 2005/0024487 A1* | 2/2005 | Chen | 348/14.13 |
| 2005/0123057 A1* | 6/2005 | MacInnis et al. | 375/240.25 |
| 2005/0129125 A1* | 6/2005 | Cha et al. | 375/240.16 |
| 2006/0126728 A1* | 6/2006 | Yu et al. | 375/240.03 |
| 2006/0165303 A1* | 7/2006 | Cha et al. | 382/240 |
| 2007/0153892 A1* | 7/2007 | Yin et al. | 375/240.03 |
| 2008/0151998 A1* | 6/2008 | He | 375/240.03 |
| 2009/0086814 A1* | 4/2009 | Leontaris et al. | 375/240.02 |
| 2010/0002770 A1* | 1/2010 | Motta et al. | 375/240.16 |

OTHER PUBLICATIONS

International Search Report and the Written Opinion Dated Aug. 31, 2010 From the International Searching Authority Re. Application No. PCT/IL2010/000405.

Chang et al. "A Model Based Motion Estimation Algorithm for Very Low Bit Rate Video Coding", IEEE 39th Midwest Symposium on Circuits and Systems, Ames, IA, USA, Aug. 18-21, 1996, XP010222710, 2: 671-673, Aug. 18, 1996.

* cited by examiner

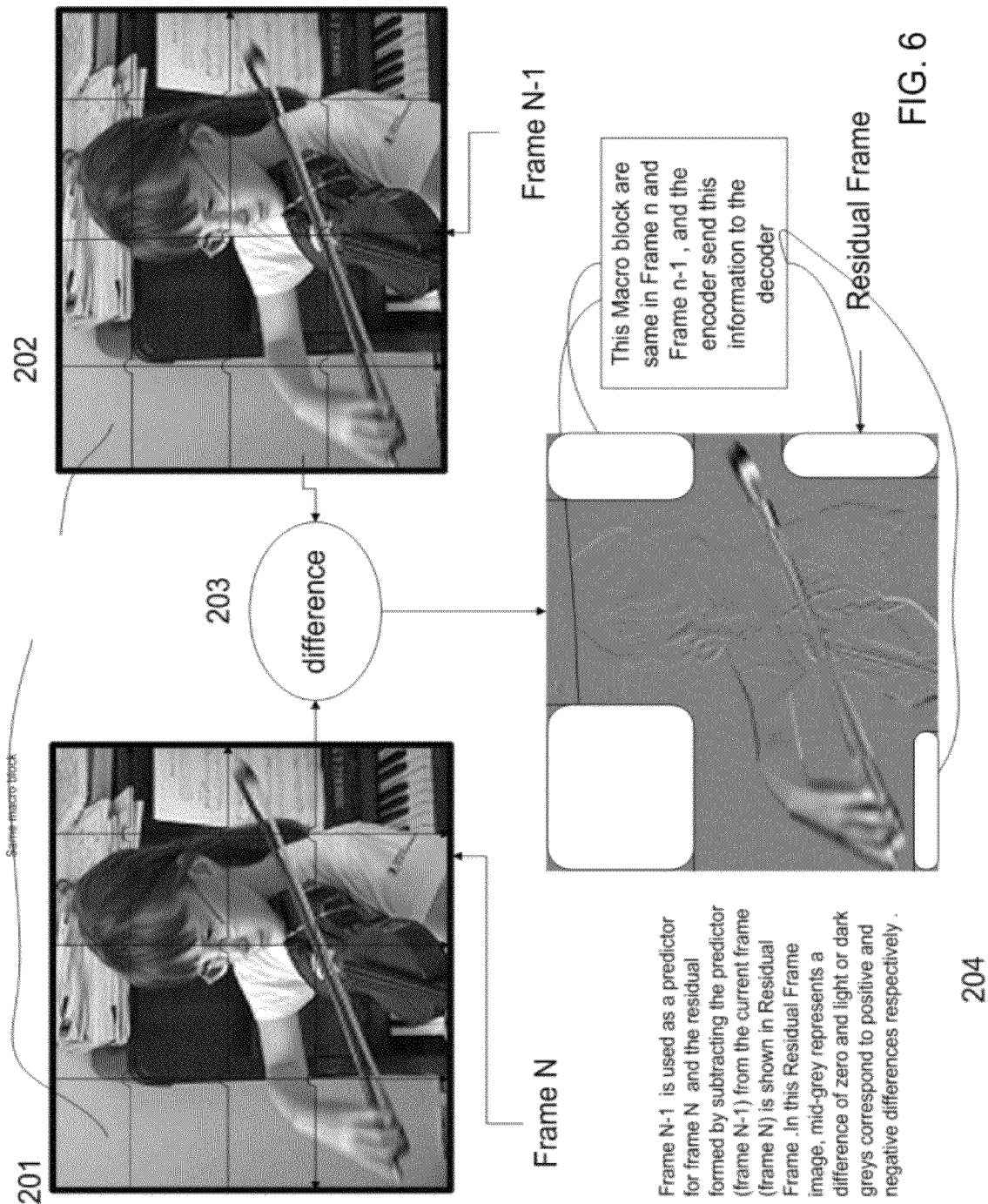

FIG. 7

Difference between $F_n$ and $F_{n-1}$

residual formed by subtracting the predictor ($F_{n-1}$) from the current frame ($F_n$) is shown in this image, mid-grey represents a difference of zero and light or dark greys correspond to positive and negative differences respectively

301

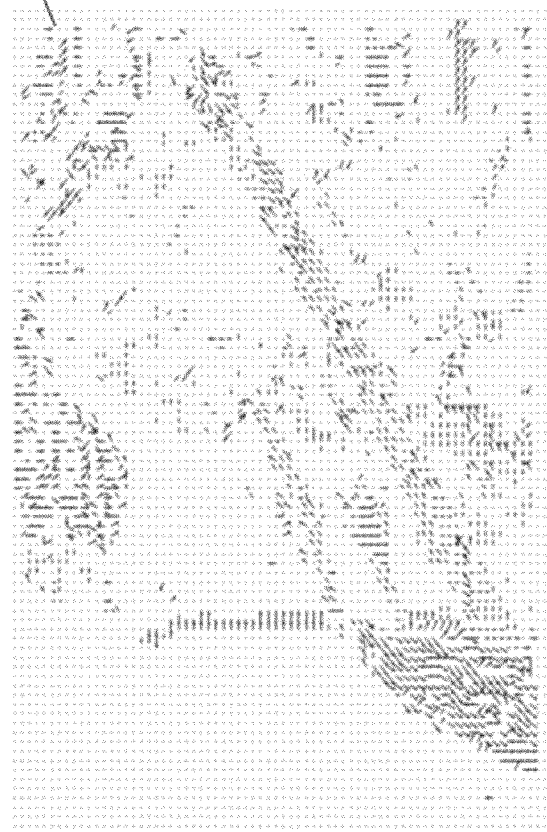

302

It is possible to estimate the trajectory of each pixel between successive video frames, producing a field of pixel trajectories known as the *optical flow*.

The Figure shows the optical flow field for the frames $F_{n-1}$ and $F_n$

FIG. 8
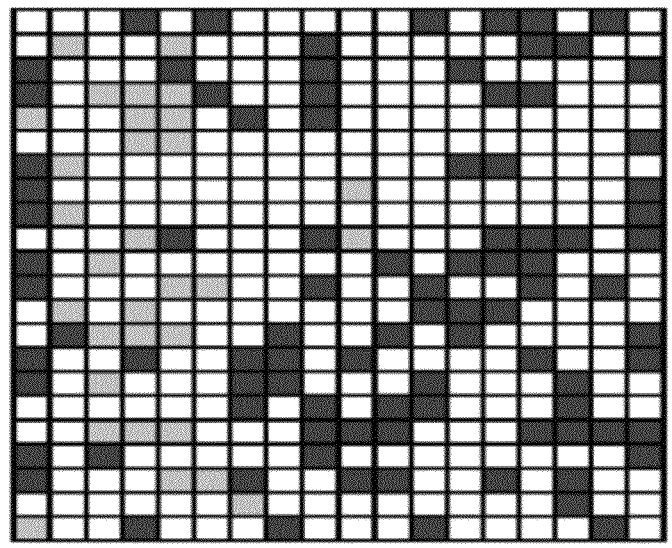
402
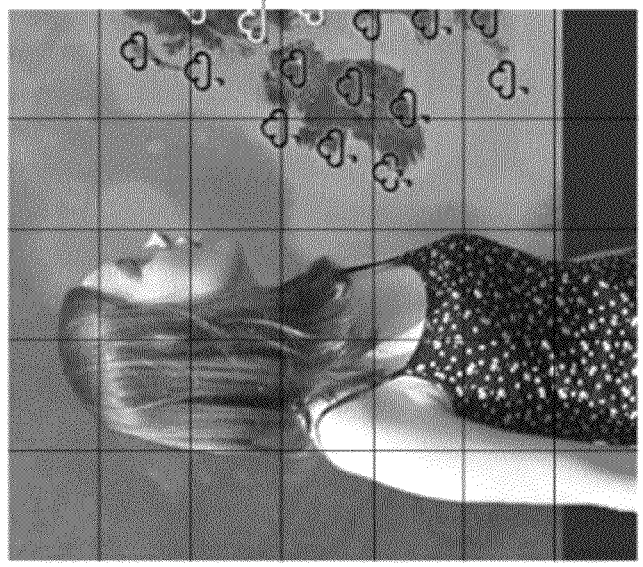
401
For each new Frame $F_n$ the Block 108 is update about the static Macro – block., mean the Macro – block that we find in all previous Frame and update the multiple Motion estimations algorithms to not process on the static macro block.

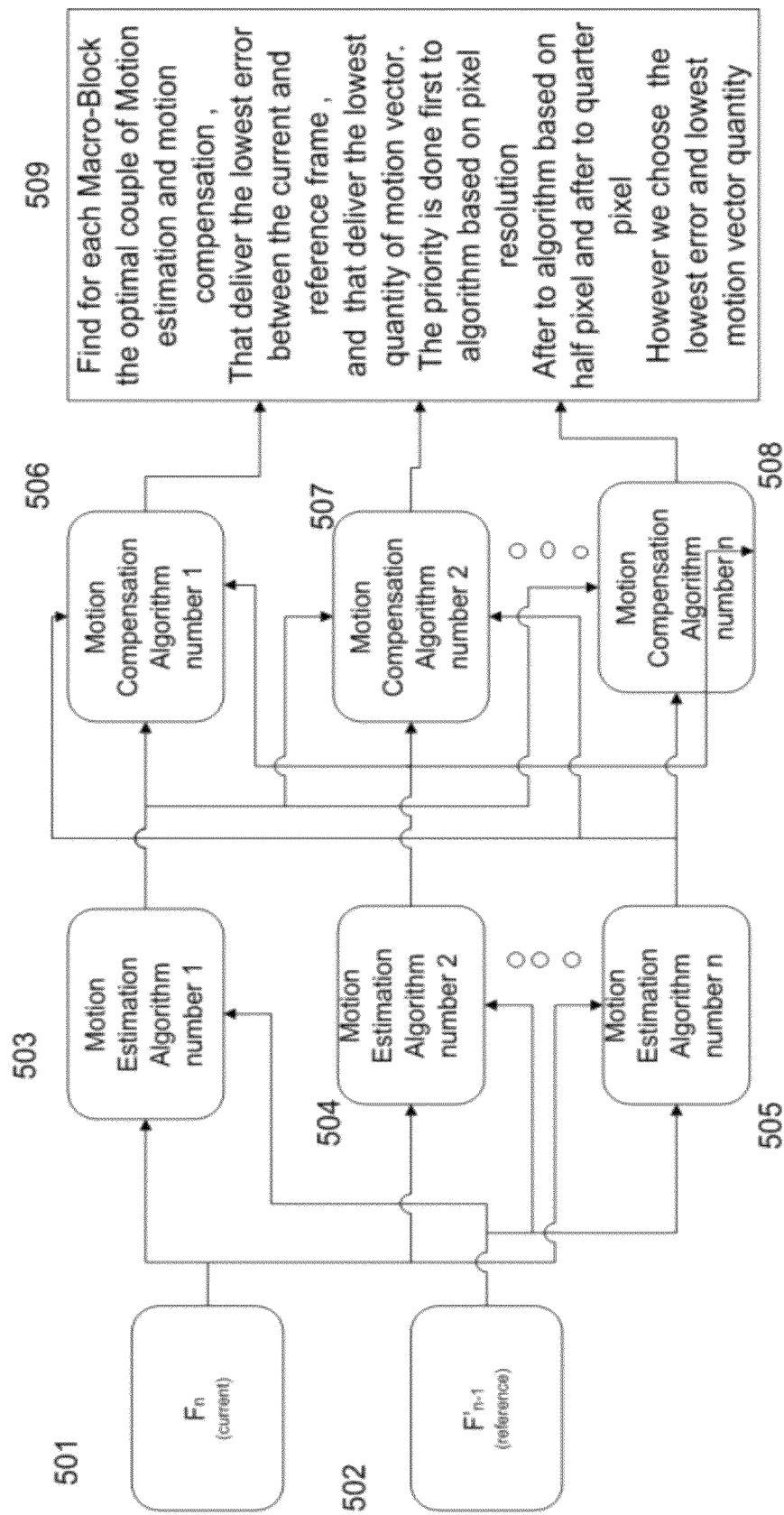

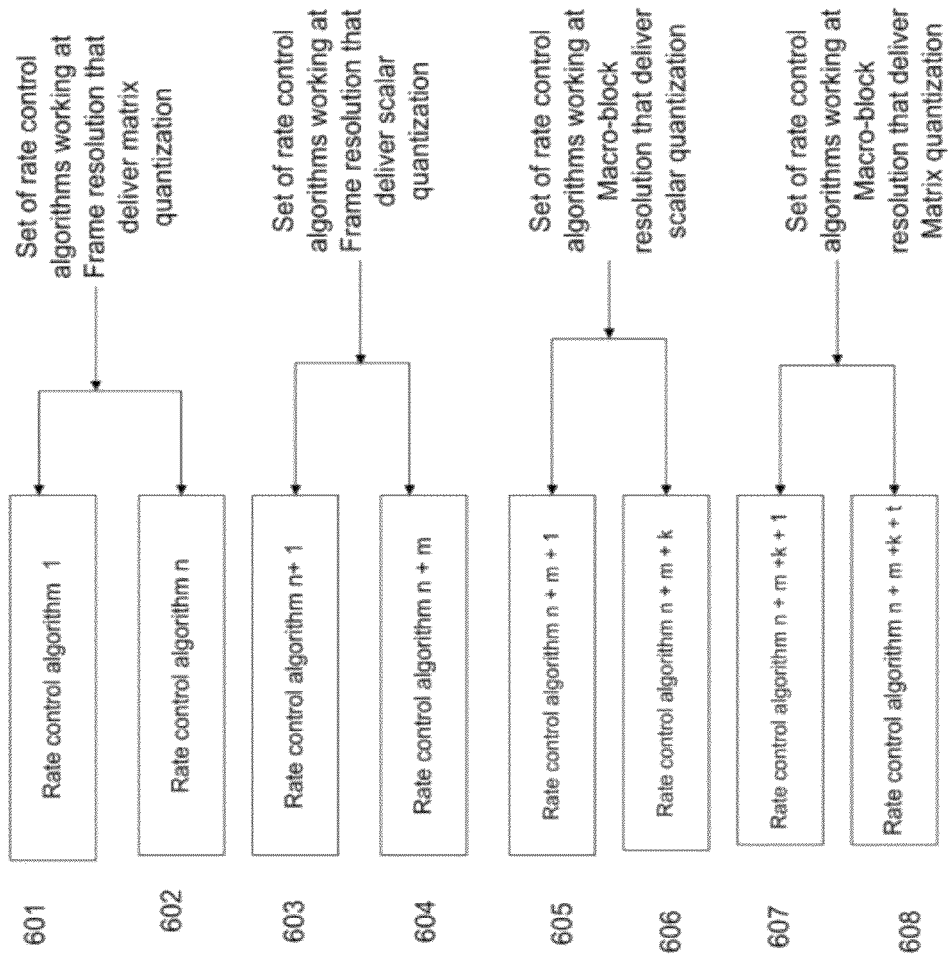

VIDEO ENCODING

RELATED APPLICATIONS

This application is a National Phase of PCT Patent Application No. PCT/IL2010/000405 having International filing date of May 20, 2010, which claims the benefit of priority of U.S. Provisional Patent Application No. 61/179,731 filed on May 20, 2009. The contents of the above applications are all incorporated herein by reference.

FIELD AND BACKGROUND OF THE INVENTION

The present invention relates to a device and method for motion estimation and compensation in video encoding.

Motion estimation is the process of determining motion vectors that describe the transformation from one 2D image to another; usually from adjacent frames in a video sequence. Motion estimation is an ill-posed problem as the motion is often in three dimensions but the images are a projection of the 3D scene onto a 2D plane. The motion vectors may relate to the whole image (global motion estimation) or specific parts, such as rectangular blocks, arbitrary shaped patches or even per pixel. The motion vectors may be represented by a translational model or many other models that can approximate the motion of a real video camera, such as rotation and translation in all three dimensions and zoom.

Closely related to motion estimation is optical flow, where the vectors correspond to the perceived movement of pixels. In motion estimation an exact 1:1 correspondence of pixel positions is not a requirement.

Applying the motion vectors to an image to synthesize the transformation to the next image is called Motion compensation. The combination of motion estimation and motion compensation is a key part of video compression as used by MPEG 1, 2 and 4 as well as many other video codecs. The present application relates to combinations of motion estimation and motion compensation algorithms.

For any given codec a particular motion estimation algorithm is used. More advanced codecs are able to vary parameters of the motion estimation algorithm dynamically during processing, say to compensate for different circumstances appearing in the video.

International Patent Application WO 2009/066284A2 teaches a codec that switches dynamically between several motion estimation algorithms. However it always uses a standard motion compensation algorithm so that it can work with a standard decoder.

SUMMARY OF THE INVENTION

According to one aspect of the present invention there is provided a computerized method for encoding video comprising:
   dividing a video frame into macroblocks;
   for each macroblock finding a minimal error motion estimation compensation algorithm pair that encodes and decodes the macroblock with a smallest error; and
   encoding the frame by encoding each macroblock with a motion estimation algorithm of the respective minimal error motion estimation compensation pair.

An embodiment may comprise finding settings for the minimal error motion estimation compensation pair which settings further minimize the error.

In an embodiment, the settings comprise a pixel precision setting.

An embodiment may comprise setting an overall rate control for a region of macroblocks as a function of respective rate controls which are best settings for the individual macroblocks within the region.

An embodiment may comprise setting a control rate algorithm by operating a sequence of control rate algorithms and selecting between a control rate algorithm providing the best results at macro block level and a control rate algorithm providing the best results at r frame level.

In an embodiment, the finding a minimal error motion estimation compensation pair comprises running each one of a plurality of motion estimation compensation pairs on the macroblock, measuring an error for each pair and selecting the pair giving the smallest error.

An embodiment may comprise assigning a null motion estimation compensation pair to macroblocks showing no motion.

An embodiment may comprise carrying out motion searches by comparing blocks of a maximum size of 8×8 pixels in succeeding frames.

An embodiment may comprise adding an identification of the minimal error motion estimation compensation pair used to encode each macroblock to encoded video, the identification being usable by a corresponding decoder to select the corresponding motion compensation algorithm to decode the respective macroblock.

According to a second aspect of the present invention there is provided a computerized method for decoding video, the video having been encoded per macroblock by finding for each macroblock a minimal motion estimation compensation pair which gives a minimal error, encoding each macroblock using the corresponding motion estimation algorithm and embedding into the video an identification of the corresponding motion compensation pair, the decoding comprising extracting from the encoded video the identification and selecting a motion compensation algorithm for a respective macroblock according to the identification, therewith decoding the macroblock.

According to a third aspect of the present invention there is provided an encoder apparatus for encoding video frames, comprising:
   a macroblock unit for dividing incoming frames into macroblocks;
   an optimization unit for finding for each macroblock a minimal error motion estimation compensation pair of algorithms that encodes and decodes a respective macroblock with minimal error; and
   a video output for outputting an encoded version of the respective incoming frame wherein each macroblock is encoded with a motion estimation algorithm of the respective minimal error motion estimation compensation pair.

The video decoder apparatus may comprise an extraction unit for extraction of information relating to the minimal error motion estimation compensation pair of algorithms used with each macroblock and a decoding unit for decoding each frame by macroblocks, using the motion compensation algorithm of the respectively identified pair for each macroblock.

A computerized method of a further aspect of the present invention for encoding video may comprise:
   dividing a video frame into macroblocks;
   for each macroblock finding a least movement motion estimation compensation algorithm pair that encodes and decodes the macroblock with a smallest amount of movement; and
   encoding the frame by encoding each macroblock with a motion estimation algorithm of the respective least movement motion estimation compensation pair.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6 is a simplified diagram showing motion estimation and identification of macroblocks with no movement, according to an embodiment of the present invention;

FIG. 7 is a simplified diagram contrasting a difference calculation with an optical flow, for use with an embodiment of the present invention;

FIG. 8 is a simplified diagram showing a frame and illustrating how macroblocks in the frame may be mapped into inter, intra and static macroblocks according to an embodiment of the present invention;

FIG. 9 shows in greater detail a part of the architecture of the encoder of FIG. 5 in which motion estimation compensation pairs are tested for individual macroblocks according to embodiments of the present invention;

FIG. 10A shows in schematic form available rate control algorithms grouped into different types, for use in block 114 of FIG. 5;

DESCRIPTION OF THE PREFERRED EMBODIMENTS

The present embodiments comprise a device and method for motion estimation and compensation in video encoding. More particularly, the present embodiments relate to a device and method for multiple motion estimation and multiple motion compensation in video encoding. A device and method according to the present embodiments, find the optimal motion estimation/compensation set in video encoding. The present embodiments may provide a device and method for multiple concurrent rate control algorithm in video encoding working at frame level and macro-block level, and may find the optimal rate control depending on distortion result in video encoding.

As will be explained in greater detail below, the present embodiments may identify static regions in the video and simply leave the static regions out of the processing.

The present embodiments may be used to provide a video codec.

A motion estimation algorithm is selected dynamically for encoding individual macroblocks of an image. The selection is made by using each motion estimation algorithm to encode the macroblock and then decoding with all available motion compensation algorithms. An error is found in each case between the source macroblock and the decoded macroblock and the pair of motion estimation and motion compensation algorithms that produces the smallest error is selected for that macroblock. As a further criterion the pair for which the result is achieved with the smallest amount of detected motion may be chosen.

The decoder has all of the motion compensation algorithms used by the encoder and information is supplied from the encoder telling the decoder which motion compensation algorithm to use for which macroblock.

Macroblocks for which no motion is detected need not be encoded at all, and the decoder is simply directed to obtain the corresponding macroblock from the previous frame. In most real life situations much of the video frame remains still and this feature may provide considerable saving in resources.

Because the pair of motion estimation and compensation algorithms is selected, the encoding and decoding may be for the first time dynamically matched. An improvement which may result is particularly noticeable on high definition television screens.

Multi-rate control is useful, particularly for Internet delivery of video. The present embodiments allow a multi-rate control feature to be provided from a rate control obtained at the frame resolution and/or macro block resolution. The feature provides scalar quantization per frame or macro block or matrix quantization per frame or macroblock in order to deliver the desired rate. The frame resolution rate control is in turn built from rate control that operates at the macro block resolution and delivers scalar quantization or matrix quantization or rate control that operates at the frame resolution and delivers scalar quantization or matrix quantization.

Figure 4:
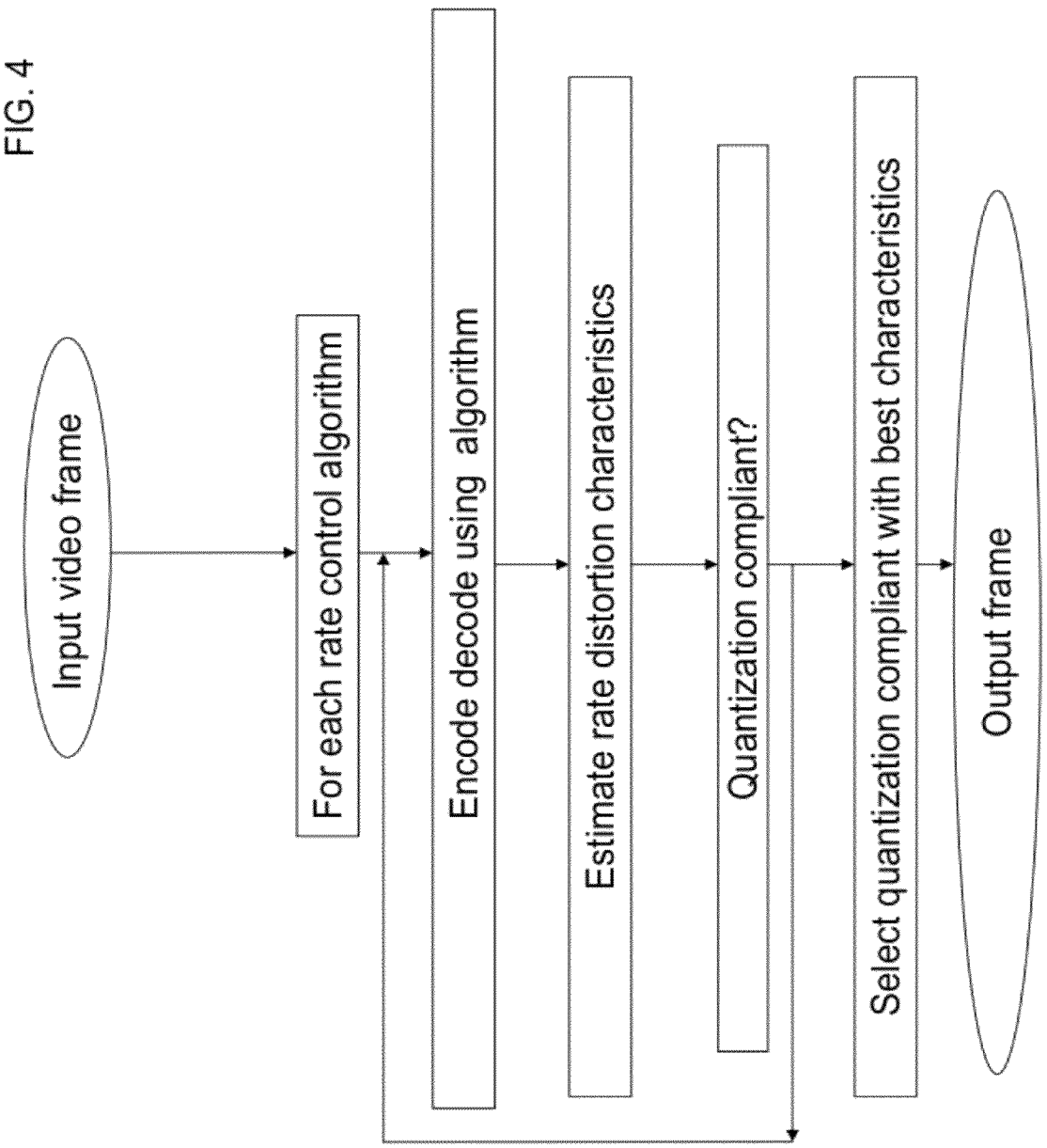
FIG. 4 is a simplified diagram illustrating dynamic rate control according to an embodiment of the present invention.

FIG. 4, which is discussed in greater detail below, illustrates an exemplary procedure for such multi-rate control over a frame. The procedure may use a series of rate control algorithms and dynamically select the rate for a given frame as follows:

For each rate control algorithm and for each frame the following procedure is carried out:

1) Estimate the rate distortion characteristics of the Frame based on a) rate distortion statistics, b) GOP length and c) a Virtual Buffer Model management arrangement.

2) Find which of the rate control algorithms provide a quantization which is compliant with other rate-distortion characteristics.

3) Compare each of the compliant algorithms to select one rate control algorithm.

4) Finally, code the frame using the selected rate control

Different kinds of rate control, for example those that work at frame resolution and those that work at macro block resolution compete with each other to see which produces the best results in the circumstances. A frame can be quantized by several rate control algorithm that work at macro bock resolution or the frame can be quantized by a rate control that work at frame resolution.

Estimating of the rate distortion characteristics of the Frame may be based on a) rate distortion statistics, b) GOP length and c) a Virtual Buffer Model management arrangement for each rate control algorithms. Some rate control methods may operate at frame resolution. Other rate control methods may operate at macro block resolution. Yet other rate control methods may use scalar quantization, and others may operate on the basis of matrix quantization. Various such methods may be used concurrently and the system may choose the best one based on the achieved distortion level.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
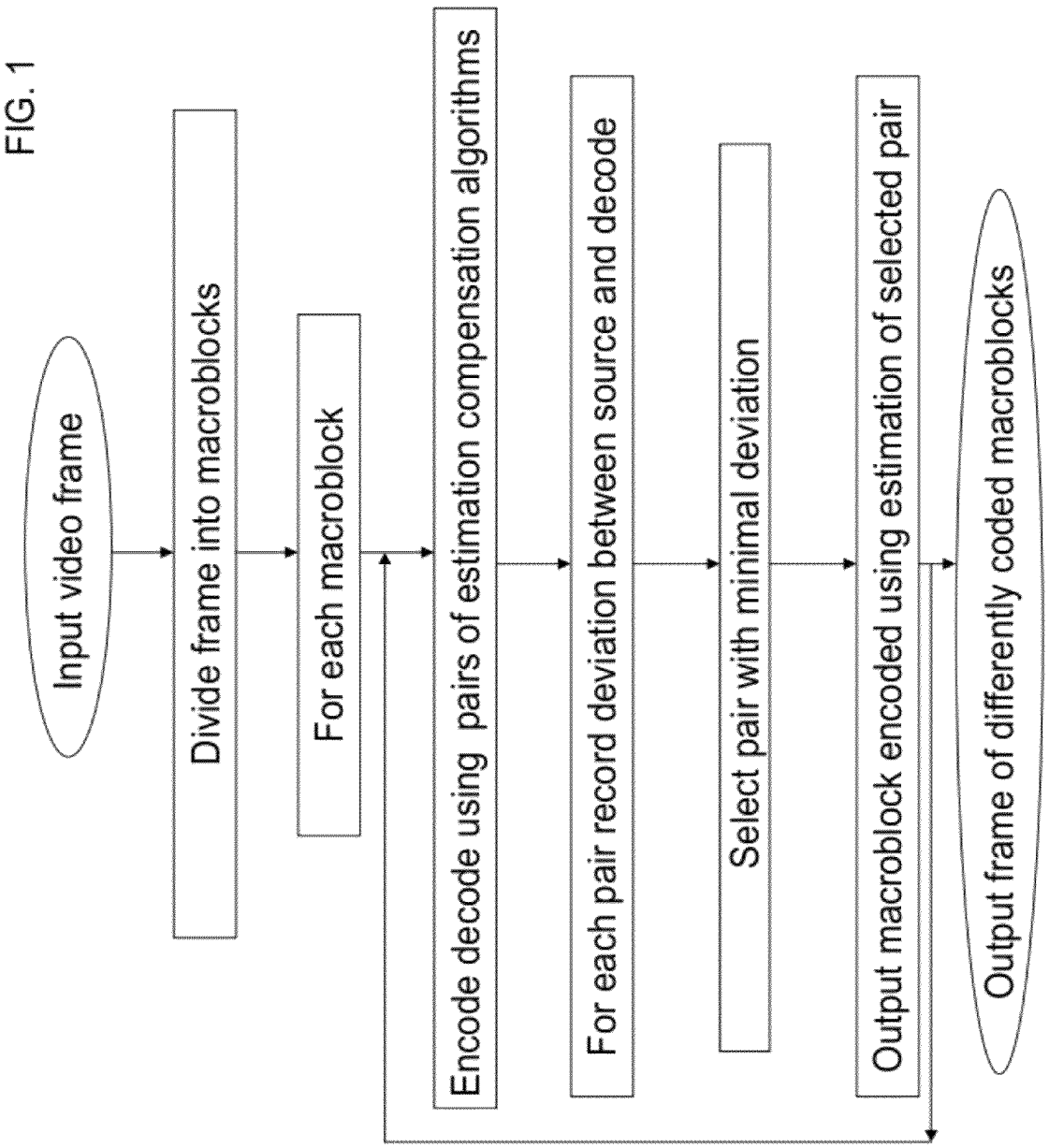
FIG. 1 is a simplified diagram illustrating a simplified flow chart of operation of an encoder device according to a first embodiment of the present invention.

Reference is now made to FIG. 1 which is a simplified flow chart showing a computerized method for encoding video. The method involves dividing a video frame into macroblocks, then for each macroblock testing a series of pairs of motion estimation and motion compensation algorithms. The first of the algorithms in the pair encodes the frame and the second decodes it. The idea is to find for each pair of algorithms the deviation or error that is introduced to the macroblock by encoding and then decoding, and find which pair gives the minimal error for that particular macroblock. An alternative or additional criterion is to select the pair that encodes the video with the smallest amount of detected motion. The pair giving the minimal deviation or minimal motion, or an optimum between the two, is selected and the macroblock as encoded by the corresponding motion estimation algorithm is placed into the encoded frame for output. It is noted that the encoded macroblock has already been generated at the test stage so merely needs to be passed on to the output.

An encoded version of the input frame is thus provided in which each macroblock is differently encoded. Specifically each macroblock is encoded with the motion estimation algorithm of the minimal error motion estimation compensation pair that was identified for that macroblock.

The method may further comprise finding best settings for the minimal error motion estimation compensation pair selected, with a view to further minimizing the error.

The settings may include a rate control. A given rate control may be ideal for a given macroblock, however an overall rate control may be set for a region of macroblocks as a function of those which are best for the individual macroblocks in the region.

Finding a minimal error motion estimation compensation pair may involve actually running each one of a plurality of motion estimation compensation pairs on the macroblock, and then measuring the deviation between the macroblock before encoding and decoding and the macroblock after.

The above method may involve assigning a null motion estimation compensation pair to macroblocks showing no motion. For macroblocks that do not change, the decoder is simply required to provide the macroblock of the previous frame. In typical real world video scenes at least 70% of the scene remains unchanged between succeeding frames. Thus the use of the null operation adds considerable efficiency.

For the motion estimation itself, motion is detected between the given macroblock of the current frame and the previous frame. Motion detection is typically carried out using motion searches in blocks of 16×16 macroblocks. Using smaller blocks tends to introduce errors. However using the present embodiments, where each macroblock is being given its own optimized algorithm, it is feasible to carry out motion searches by comparing blocks of 8×8 pixels or less.

An identification of the minimal error motion estimation compensation pair that is used to encode each macroblock may be added to the encoded video. The corresponding decoder may use the identification to select the corresponding motion compensation algorithm to decode the respective macroblock.

Figure 2:
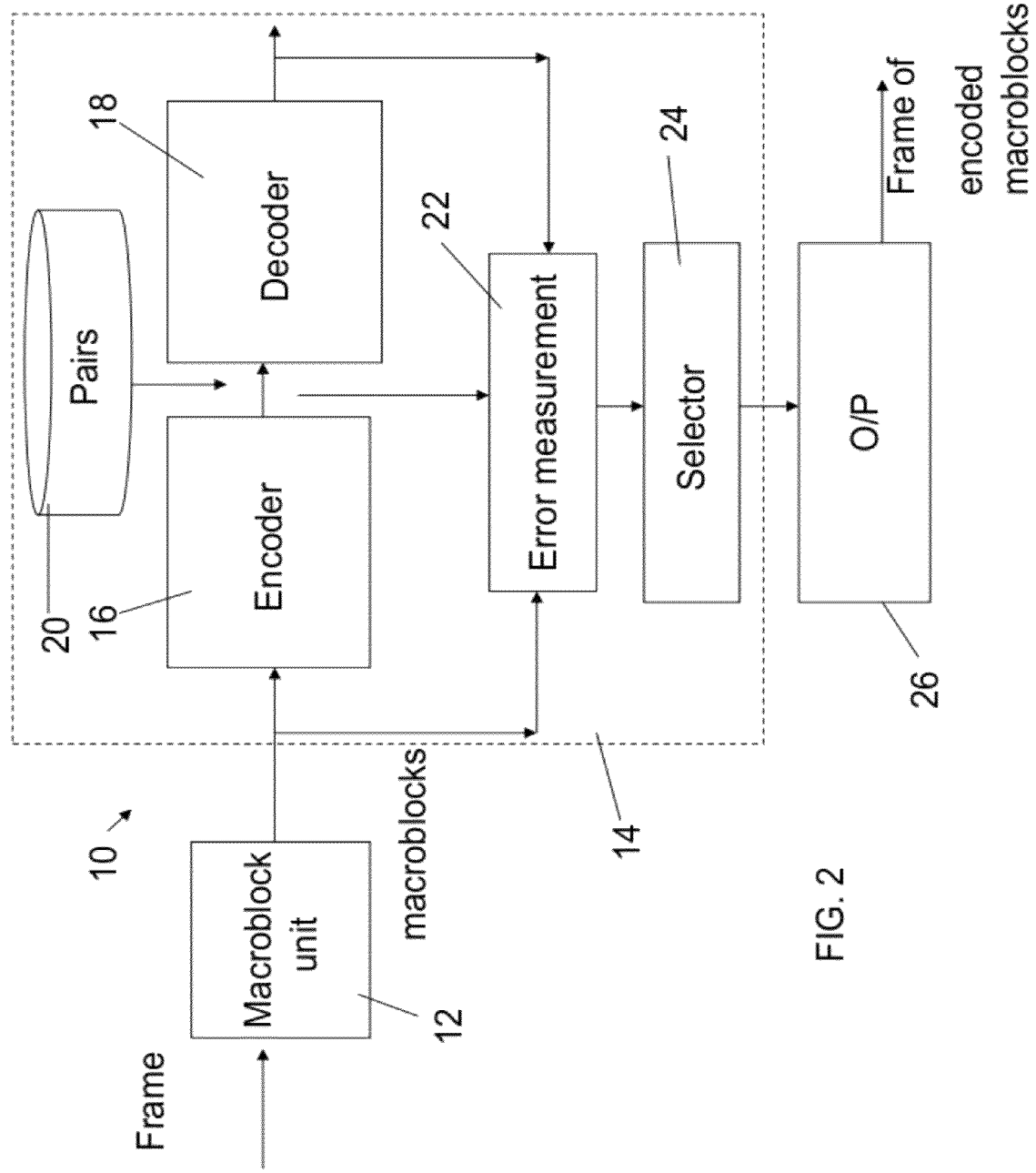
FIG. 2 is a simplified schematic diagram illustrating an encoder for encoding video frames by macroblocks according to an embodiment of the present invention.

Reference is now made to FIG. 2, which shows a video encoder apparatus 10 for encoding video frames. The encoder comprises a macroblock unit 12 for dividing incoming frames into macroblocks. The frames may be divided into macroblocks in any conventional way. There are systems which use fixed sizes of macroblocks and variable sizes of macroblocks and any of these may be used.

An optimization unit 14 includes an encoder 16 and a decoder 18. The encoder and decoder successively encode and decode the current macroblock for each of a set of pairs of encoding and decoding algorithms or parameters located in pairs database 20. In each case the end result is compared with the input at comparator 22 to find out which pair gives the smallest error or deviation, or encodes the information with the smallest amount of detected motion. The idea is to find for each macroblock a minimal error motion estimation compensation pair of algorithms that encodes and decodes a respective macroblock with minimal error, and or minimal motion. The pair is selected by selector 24 and the output for each macroblock is that macroblock as encoded by the motion estimation algorithm of the selected pair.

Video output 26 then outputs an encoded version of the incoming frame in which each macroblock is encoded with a motion estimation algorithm of the respective minimal error motion estimation compensation pair. That is to say the output is a frame in which each of the macroblocks is encoded using its own optimal pair of algorithms.

Figure 3:
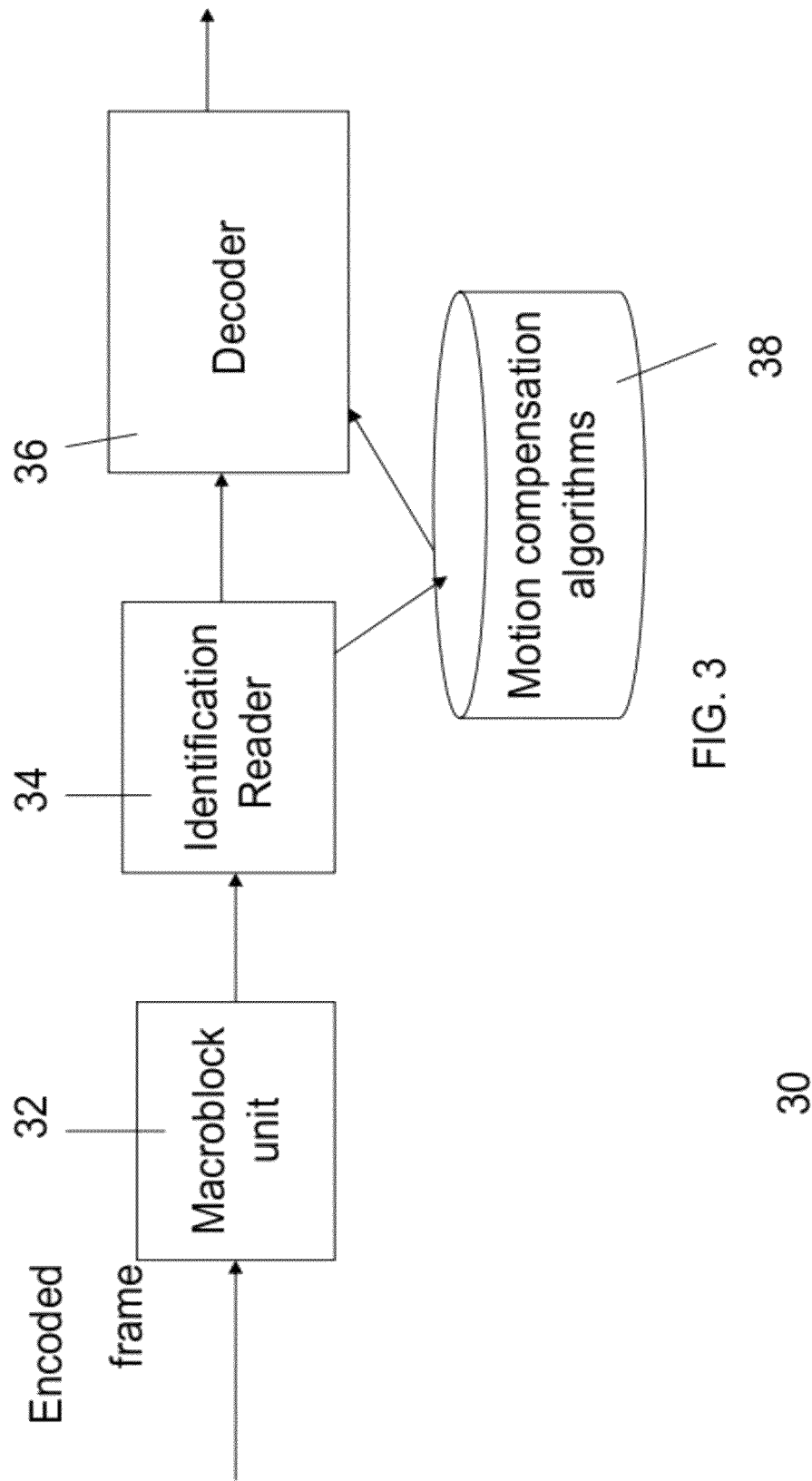
FIG. 3 is a simplified schematic diagram illustrating a decoder for decoding video frames by macroblocks that have been encoded by the encoder of FIG. 2.

Reference is now made to FIG. 3, which is the corresponding decoder apparatus which receives the frame as encoded by the apparatus of FIG. 2. The video decoder apparatus 30 includes a macroblock unit 32 for first breaking down the received frame into macroblocks. An extraction unit 34 extracts or reads identification information relating to the minimal error motion estimation compensation pair of algorithms used with each macroblock and a decoding unit 36 decodes each frame by macroblocks, using the motion compensation algorithm that belongs to the pair identified, which is obtained from a database 38 of the decoding options available.

Encoding and decoding according to the present embodiments allows for dynamic switching between pairs of motion estimation algorithm and motion compensation algorithms to deal effectively with rapidly changing situations in the video.

The null process referred to above allows the situation to save resources when faced with macroblocks that stay the same between succeeding frames. In such cases the already available macroblock from the earlier frame is simply reused.

The decoder is able to switch between different motion compensation algorithms based on information sent by the encoder.

Multi-rate control is useful, particularly for Internet delivery of video. The present embodiments allow a multi-rate control feature to be provided from a rate control obtained at the frame resolution. The feature provides scalar quantization or matrix quantization in order to deliver the desired rate. The frame resolution rate control is in turn built from rate control that operates at the macro block resolution and delivers scalar quantization or matrix quantization.

Reference is now made to FIG. 4, which illustrates an exemplary procedure for such multi-rate control over a frame. As discussed above, the procedure may use a series of rate control algorithms as before and dynamically select the rate for a given frame as follows:

For each rate control algorithm and for each frame the following may be carried out:

Estimate the rate distortion characteristics of the Frame based on a) rate distortion statistics, b) GOP length and c) a Virtual Buffer Model management arrangement.

Find which of the rate control algorithms provide a quantization which is compliant with other rate-distortion characteristics.

Compare each of the compliant algorithms to select one rate control algorithm.

Finally, code the frame using the selected rate control.

Figure 5:
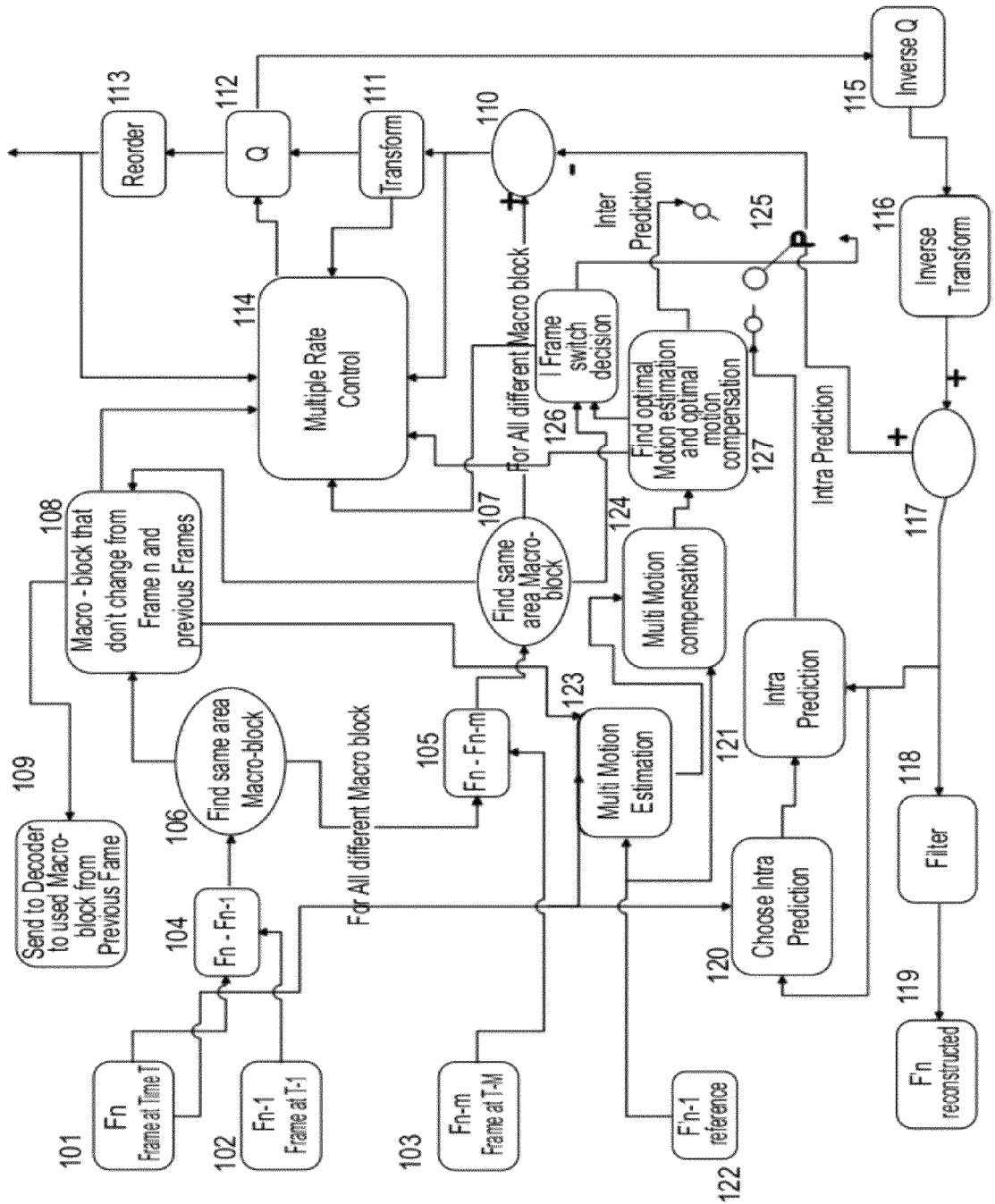
FIG. 5 is a simplified schematic diagram showing the architecture of an encoder according to an embodiment of the present invention.

Reference is now made to FIG. 5, which illustrates a more detailed embodiment of an encoder according to the present embodiments. In FIG. 5, Fn: Frame or field n, input Frame or Field at the current time n.

Fn−1: Frame or field n−1, is the previous Frame or Field at time n−1.

Fn−m: Frame or field n−m, is the previous Frame or Field at time n−m.

An input frame or field Fn (101) is processed in units of a macro block. Each macro block of the input frame or field Fn 101 is compared for movement detection using block 104. Comparison block 104 is discussed in greater detail in respect of FIGS. 6, 7 and 8 hereinbelow. First of all, in the case of frame Fn−1 102, a restriction is applied in that we compare the macro-block with that at the same position in the preceding frame. This means for example that if we want to compare the macro-block number 23 of frame Fn 101 then the comparison is made with macro-block 23 of frame Fn−1 102. Block 106 finds the similar macro-block at a similar position in frames Fn and Fn−1 and updates the block 108 position for similar macro-blocks at frame or field Fn. The block 108 updates the entire system not to process the present macro block and instead the decoder is told to take the present macro block from the previous frame, that is from frames Fn−1, . . . , Fn−m previously sent. The same process is carried out with an older frame 103 and process at block 107. The output of block 107 provides all the macro-blocks that are not found in older frames at similar positions, and only these macro-blocks are encoded in the intra or inter mode.

Now after eliminating the unchanged macro-blocks, each remaining macro block is encoded in the intra or inter mode. For each block in the macro block, a prediction PRED, which is marked 'P' 125 in FIG. 1, is formed based on reconstructed picture samples. In Intra mode, the output of block 121, PRED, is formed from samples in the current slice that have been previously encoded, decoded and reconstructed. That is to say, the output of block 117 is sent to blocks 118, a filter, 120 which chooses an intra prediction and block 121 which holds the selected prediction from block 120.

In Inter mode, which uses the output of the optimizer block 127, PRED 125 is formed by multiple motion estimation algorithms in block 123. Block 123 carries out multiple motion estimations algorithms. The algorithms may be different algorithms or may be the same motion estimation algorithm with different settings, For example the same algorithm may be used with different settings such as pixel precision, for example precisions set at a pixel, half pixel, quarter pixel or more or less. Likewise numerous motion compensation algorithms 124 may be used to form the prediction.

The prediction may be obtained from one or two reference frames selected from the set of frames discussed above. In FIG. 1, the reference is shown as the previous encoded frame F'n−1 (122) but the prediction reference for each macro block partition (in inter mode) may be chosen from a selection of past or future frames, typically in display order that have already been encoded, reconstructed and filtered via block 118. Block 127 then finds the optimal pair of motion estimation and compensation algorithms that delivers the lowest error and the lowest quantity of motion vector. The information of the selected motion compensation algorithm is then sent to the decoder to allow it to decode the present macro block with the correct motion compensation algorithm.

The prediction PRED 125 is subtracted from the current block to produce a residual. or difference, block Dn 110 that is transformed, using a block transform and quantized using the multiple rate control algorithm 114 as will be discussed in greater detail in respect of FIGS. 10A and 10B hereinbelow, to give the quantization. The quantization may be defined by a set of quantized transform coefficients which are reordered and entropy encoded, as per boxes 111 transform, 112, Q and 113 reorder. The entropy-encoded coefficients, together with side information required to decode each block within the macro block form the compressed bit stream which is passed to a Network Abstraction Layer (NAL) for transmission or storage. The side information may include prediction modes, quantized parameter, motion vector information, etc.

As well as encoding and transmitting each block in a macro block, the encoder decodes, or in other words reconstructs, the macro block to provide a reference 119 for further predictions. The coefficients are scaled (Q-1) in block 115 and inverse transformed (T-1) in block 116 to produce a difference block Dn. The prediction block PRED is added to D_n to create a reconstructed block F'n in the reconstruction block 119 as discussed above. The filter 118 is applied to reduce the effects of blocking distortion and the reconstructed reference frame is created from a series of blocks F'n.

Reference is now made to FIG. 6, which explains how the blocks 104 and 106 of FIG. 5 may work. First of all the Frame Fn 201 is compared 203 with Frame Fn-1. As discussed above the comparison is only between macro blocks with similar position. As shown at block 204 the shapes in white indicate where similar macro blocks have similar positions in the two successive Frames. These macro blocks are not encoded but the decoder is simply told to obtain them from the earlier macro block.

The simplest method of temporal prediction is to use the previous frame as the predictor for the current frame. Two successive frames from a video sequence are shown in FIG. 6, denoted 201 and 202.

Frame Fn-1 202 is used as a predictor for frame Fn 201 and a residual is formed by subtracting the predictor Frame Fn-1 202 from the current frame Fn 201. The residual is shown in FIG. 7 as frame 301. In frame 301, mid-grey represents a difference of zero and light or dark greys correspond to positive and negative differences respectively.

The obvious problem with this simple prediction is that a lot of energy remains in the residual frame, and this is indicated by the light and dark areas. The consequence is that there is still a significant amount of information to compress after temporal prediction. Much of the residual energy is due to object movements between the two frames and a better prediction may be formed by compensating for motion between the two frames.

The lower frame 302 in FIG. 7 image shows the optical flow for the frames of 201 and 202. The complete field contains a flow vector for every pixel position but for clarity, the field is sub-sampled so that only the vector for every $2^{nd}$ pixel is shown. If the optical flow field is accurately known, it should be possible to form an accurate prediction of most of the pixels of the current frame by moving each pixel from the reference frame along its optical flow vector. In frame 302 we show the identical macro block at the same position.

Reference is now made to FIG. 8, which shows an explanation of the list set and update made at each frame by the block 108 of FIG. 5. Frame 402 shows frame 401 divided into three different types of macro blocks. The blocks colored white are those that remain static. A static macro block is obtained using blocks 104, 105, 106, 107 and 108 of FIG. 1. Frame 402 is essentially a list or a key to frame 401 and updates the decoder with all the frame elements that require no further work.

Reference is now made to FIG. 9, which shows in greater detail the operation of blocks 123, 124 and 127 of FIG. 5.

The current frame Fn 501 and the reference frame F'n-1 502 are distributed to a set of motion estimation algorithms 503, 504 and 505 that work independently. The set of algorithms can be the same motion estimation algorithm with different settings and/or different motion estimation algorithms, as discussed above. Each motion estimation algorithm result, here represented by 503, 504 and 505, is sent for decoding to all the available different motion compensation algorithms, 506, 507 and 508. The results for each pair of motion estimation and motion compensation algorithms provide a range of possible residuals. These residuals are sent to block 509 which chooses the motion estimation, motion compensation pair that delivers the lowest error between the current Frame 501 and reference frame 502 and that also delivers the smallest quantity of motion vector.

Figure 10B:
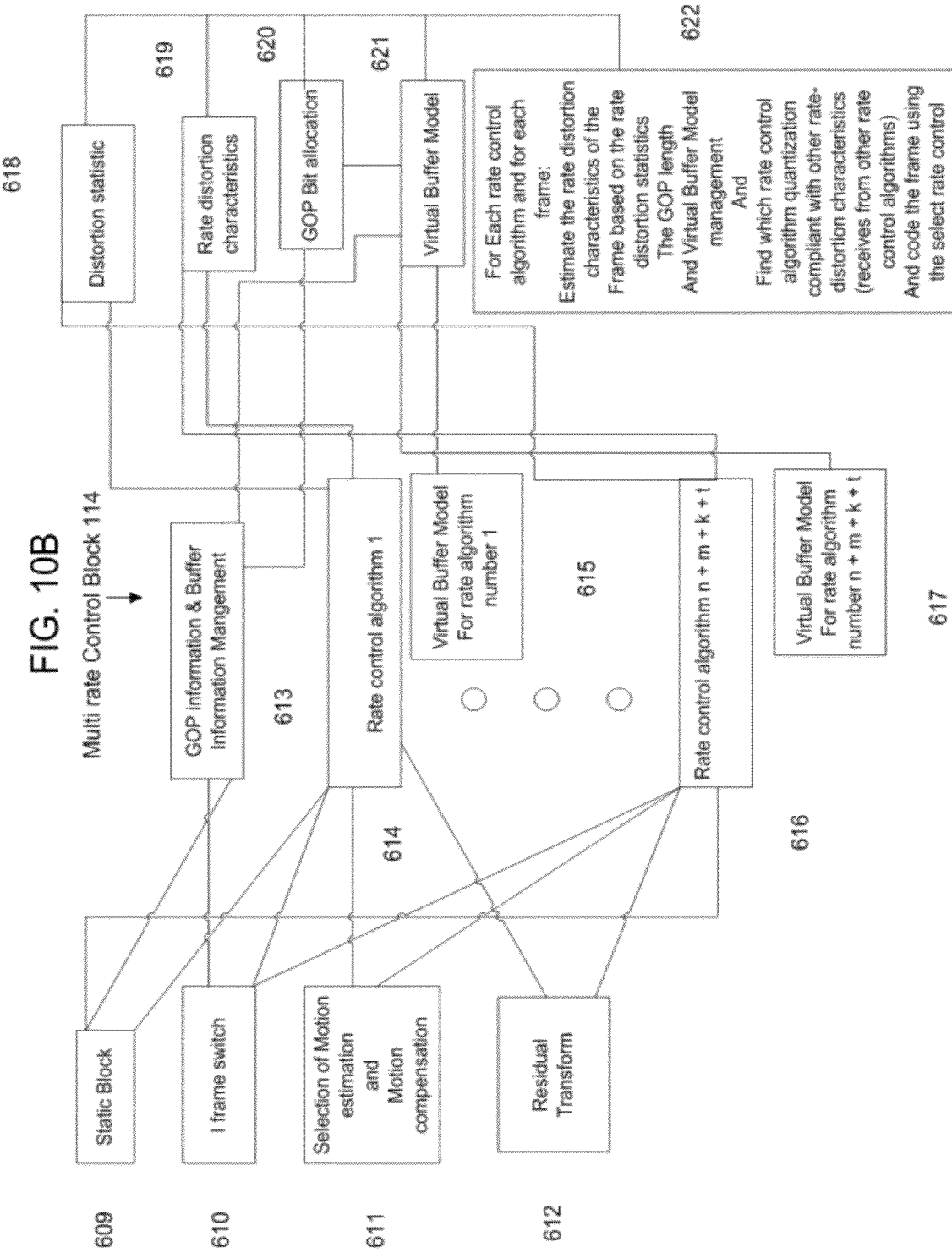
FIG. 10B shows in schematic form the constituent parts of block 114 of FIG. 5.

Reference is now made to FIGS. 10A and 10B which between them provide further details regarding the rate control block 114 of FIG. 1.

FIG. 10A shows a classification of rate control algorithms for block 114. The block comprises a set of control algorithms of different rates, including a first set of different rate control algorithms that deliver a matrix quantization per macro, as shown in blocks 607 and 608. A second set of different rate control algorithms delivers a scalar quantization per macro, as shown in blocks 605 and 606. A third set of different rate control algorithms deliver a matrix quantization per frame, as per blocks 601 and 602. Finally a fourth set of different rate control algorithms deliver a scalar quantization per frame, as shown in blocks 603 and 604.

FIG. 10B shows in greater detail the process of block 114, including constituent sub-blocks. Each rate control algorithm 614 ... 616, depending on requirements, receives the following information, the number of static blocks 609, the residual error from the selection of the optimal pair of motion estimation and motion compensation algorithms 1611 and the residual transform 612.

The GOP information & Buffer management 613 is updated from the static block 609 and the I frame switch 610, to manage the size of the virtual buffer and update the GOP.

Each rate control algorithm 614 and 616 may have its own virtual buffer respectively, 615 ... 617.

The distortion statistic block 618 and rate distortion characteristics 619 are obtained from all the different rate control algorithms in the same way that the virtual buffer model 621 collects the virtual buffer from each rate control algorithm 615 and 617. However the virtual buffer 621 may receive the GOP bit allocation 620 and the GOP management 613. The GOP information management block 613 updates the GOP bit 620 and the virtual buffer 621.

Figure 11:
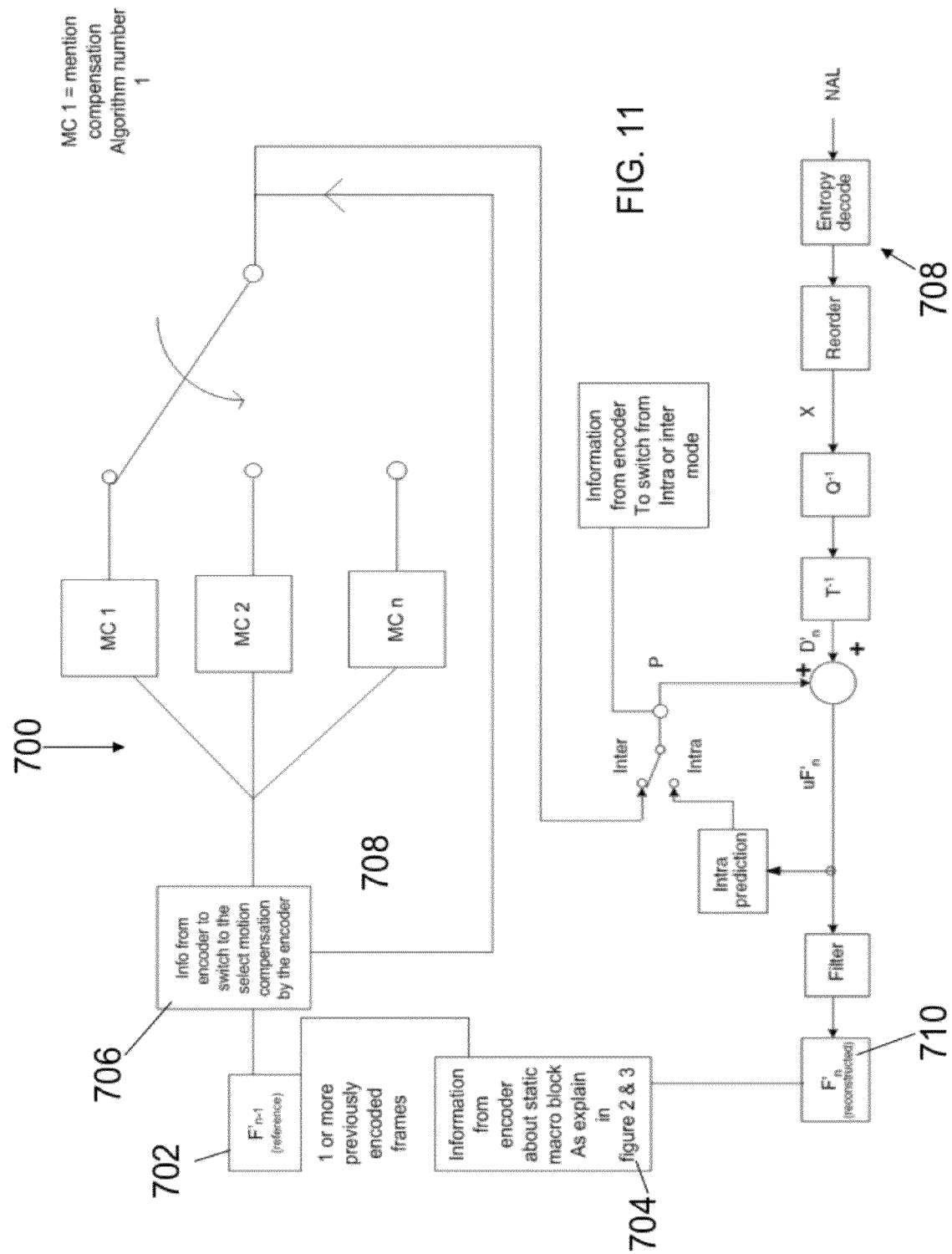
FIG. 11 is a simplified block diagram showing the architecture of a decoder according to an embodiment of the present invention.

FIG. 11 shows the architecture of the decoder of FIG. 3 above. Decoder 700 comprises a reference frame 702 and obtains the encoded macroblocks of the current frame as well as information about which macroblocks are static 704, which motion estimation algorithm to use for each encoded macroblock 706 and other side information 708, needed for the rate. The different motion compensation algorithms MC1 ... MCn are all available in the decoder and the given macroblock is switched through the motion compensation algorithm indicated in its information.

Rate decoding is carried out and the decoder switches between an inter mode for an inter prediction path and an intra mode for an intra prediction path, to produce the reconstructed frame at 710.

Any suitable method of motion estimation may be used in the present embodiments and the following is a partial list:
Block Matching
Phase Correlation
Pel-Recursive Methods
(Netravali-Robbins, Walker-Rao, Wiener-Estimation Based)
The Horn-Schunck Algorithm
Others (Nagel, Fogel, etc.)
Spatiotemporal Energy Methods
Stochastic-Model Based Methods
Full Search Motion Estimation
Rate Distortion optimized Full Search Motion Estimation
Alternate Pel Subsampling
Three Step Search
Region Diamond Search
Hierarchical Motion Estimation
Zero Motion Vector
RBMAD & Full Search
MME & Full Search
PDC & Full Search
DPC & Full Search
BBM & Full Search
Integral Projection Matching The following is a partial list of different motion compensation algorithms that may be considered in the present embodiments:
block motion compensation
Variable block-size motion compensation
Overlapped block motion compensation
Quarter Pixel (QPel) and Half Pixel motion compensation
Fixed Size Block-Matching (FSBM)
Variable Size Block-Matching (VSBM)
Object based block-matching motion compensation
Fixed Size Block-Matching (FSBM)
Variable Size Block-Matching (VSBM)

The following is a non-comprehensive list of rate control algorithms that may be used in the present embodiments:
MPEG Test Model 5 Algorithm
Delayed-Decision Bit-Rate Control
Lagrange Multiplier Techniques
Trellis-Based Techniques
Techniques for Dependent Quantization
Approximation Models for Rate and Distortion Functions
Statistical Model for Gaussian Source
Exponential Model
Bit-Rate Control Using Gradient Search 47
Solution Using Gradient Search Techniques
Penalty Functions
Iterative Gradient Search
Integer Approximation
Initialization
Approximation of Rate-Distortion Functions
Spline Approximation Method
Compliance Test for Intra-Frame Approximation
Application to Local Adaptive Quantization
Inter-Frame Dependency Model
R-D Model of Predictive Frames
Bit-Rate Control with Approximated R-D
Revised Gradient-Based Algorithm
Fast Bit-Rate Control Schemes
Fast Bit-Rate Control with Predicted R-D It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computerized method for encoding video comprising:
dividing a video frame into variable size macroblocks;
for each macroblock finding a minimal error motion estimation compensation algorithm pair, said finding comprising using motion estimation to encode and decode said macroblock using different pairs to find the pair that encodes and subsequently decodes with a smallest error; and
encoding said frame by:
encoding each macroblock by estimating motion with a motion estimation algorithm of said respective minimal error motion estimation compensation pair;
carrying out multiple concurrent rate control of said frame and of said macroblocks respectively; and
using said rate control to provide a quantization of said motion estimation,
wherein said multiple concurrent rate control comprises setting a control rate algorithm by operating a sequence of control rate algorithms and selecting therefrom one member of the group consisting of the control rate algorithm providing the best results at macro block level and the control rate algorithm providing the best results at a frame level.

2. The method of claim 1, further comprising finding settings for said minimal error motion estimation compensation pair which settings further minimize said error.

3. The method of claim 2, wherein said settings comprise a pixel precision setting.

4. The method of claim 1, wherein said multiple concurrent rate control of said macroblocks comprises setting an overall rate control for a region of macroblocks as a function of respective rate controls which are best settings for the individual macroblocks within the region.

5. The method of claim 1, wherein said finding a minimal error motion estimation compensation pair comprises running each one of a plurality of motion estimation compensation pairs on said macroblock, measuring an error for each pair and selecting the pair giving said smallest error.

6. The method of claim 1, further comprising assigning a null motion estimation compensation pair to macroblocks showing no motion.

7. The method of claim 1, comprising carrying out motion searches by comparing blocks of a maximum size of 8×8 pixels in succeeding frames.

8. The method of claim 1, further comprising adding an identification of the minimal error motion estimation compensation pair used to encode each macroblock to encoded video, said identification being usable by a corresponding decoder to select the corresponding motion compensation algorithm to decode the respective macroblock.

9. A computerized method for decoding video, the video having been divided into variable size macroblocks and encoded per said variable size macroblock by finding for each said variable size macroblock a minimal motion estimation compensation pair which gives a minimal error, said finding comprising using motion estimation to encode and decode said macroblock using different pairs to find the pair that encodes and subsequently decodes with a smallest error, encoding each macroblock by generating a motion estimation using said minimal motion estimation algorithm pair and embedding into the video an identification of the corresponding motion compensation pair, said decoding comprising extracting from said encoded video said identification, selecting a motion compensation algorithm for a respective macroblock according to said identification and using said algorithm to generate motion compensation, therewith decoding said macroblock, obtaining information of multiple concurrent rate control used in said frame and said macroblocks respectively; and using said rate control to determine a quantization of said motion estimation for said decoding, wherein said information of multiple concurrent rate control comprises information regarding setting a control rate algorithm by operating a sequence of control rate algorithms and selecting therefrom one member of the group consisting of the control rate algorithm providing the best results at macro block level and the control rate algorithm providing the best results at a frame level.

10. Video encoder apparatus for encoding video frames, comprising:
   a variable size macroblock unit configured to divide incoming frames into variable size macroblocks;
   an optimization unit configured to find, for each of said variable size macroblocks, a minimal error motion estimation compensation pair of algorithms that encodes and decodes a respective macroblock with minimal error, said finding comprising using motion estimation to encode and decode said macroblock using different pairs to find the pair that encodes and subsequently decodes with a smallest error; and
   a video output configured to output an encoded version of the respective incoming frame wherein each macroblock is encoded using motion estimation with a motion estimation algorithm of the respective minimal error motion estimation compensation pair, the video output further configured to apply multiple concurrent rate control of said frame and of said macroblocks respectively; and to use said rate control to provide a quantization of said motion estimation, wherein said multiple concurrent rate control comprises setting a control rate algorithm by operating a sequence of control rate algorithms and selecting therefrom one member of the group consisting of the control rate algorithm providing the best results at macro block level and the control rate algorithm providing the best results at a frame level.

11. Video decoder apparatus for decoding video frames encoded using the video encoder apparatus of claim 10, the video decoder apparatus comprising an extraction unit configured to extract information relating to the minimal error motion estimation compensation pair of algorithms used with each macroblock and a decoding unit configured to decode each frame by macroblocks, using the motion compensation algorithm of the respectively identified pair for each macroblock.

12. A computerized method for encoding video comprising:
   dividing a video frame into variable-sized macroblocks;
   for each macroblock finding a least movement motion estimation compensation algorithm pair that encodes and decodes said macroblock with a smallest amount of movement, said finding comprising using motion estimation to encode and decode said macroblock using different pairs to find the pair that encodes and subsequently decodes with a smallest error;
   encoding said frame by encoding each macroblock by carrying out motion estimation using a motion estimation algorithm of said respective least movement motion estimation compensation pair;
   carrying out multiple concurrent rate control of said frame and of said macroblocks respectively, wherein said multiple concurrent rate control comprises setting a control rate algorithm by operating a sequence of control rate algorithms and selecting therefrom one member of the group consisting of the control rate algorithm providing the best results at macro block level and the control rate algorithm providing the best results at a frame level; and
   using said rate control to provide a quantization of said motion estimation.

\* \* \* \* \*